United States Patent [19]

Kim

[11] Patent Number: 4,861,859

[45] Date of Patent: Aug. 29, 1989

[54] CONDUCTIVE POLYMERS OF TRANSITION-METAL COMPLEXES COORDINATED BY A DIAMINO-DICHALCOGEN-BENZENE COMPOUND

[75] Inventor: Oh-Kil Kim, Burke, Va.

[73] Assignee: The United States of America as represented by the Secretary of the Navy, Washington, D.C.

[21] Appl. No.: 174,261

[22] Filed: Mar. 28, 1988

[51] Int. Cl.[4] .......................... C08G 8/02; H01B 1/00
[52] U.S. Cl. .................................. 528/210; 528/374; 252/518; 252/519
[58] Field of Search ............... 528/422, 226, 210, 374; 252/518, 519, 500

[56] References Cited

U.S. PATENT DOCUMENTS

| | | | |
|---|---|---|---|
| 3,086,001 | 4/1963 | Wildi | 260/125 |
| 3,236,705 | 2/1966 | Gilman et al. | 149/83 |
| 3,346,444 | 10/1967 | Lupinski et al. | 161/213 |
| 3,398,167 | 8/1968 | Mahler | 260/429 |
| 3,723,417 | 3/1973 | Perez-Albueme | 260/239 |
| 3,996,196 | 12/1976 | D'Alelio | 260/47 |
| 4,452,727 | 6/1984 | name | 252/518 |
| 4,529,538 | 7/1985 | Kim | 252/500 |
| 4,552,690 | 11/1985 | Ikeguchi et al. | 252/512 |
| 4,618,453 | 10/1986 | Kim | 252/500 |
| 4,620,942 | 11/1986 | Kim | 252/500 |

FOREIGN PATENT DOCUMENTS 271323 12/1986 Japan .
29007 2/1987 Japan .
116655 5/1987 Japan .

OTHER PUBLICATIONS

Synthesis and Conductivity of Polymeric Transition Metal Complexes Coordinated by Diaminobezenedithiol-Public Presentation by Inventor on 4/5 (1987).
Phthalonitrile-Based Conductive Polymers-Keller, J. of Poly. Sci.: Part A; Poly. Chem., col. 25, pp. 2569-2576 (1987).

Primary Examiner—Josephine Barr
Attorney, Agent, or Firm—Thomas E. McDonnell; Jimmy D. Wheelington

[57] ABSTRACT

Polymeric metal complexes were prepared by coordination reactions of 2,5-diamino-1,4-benzenedithiol (DADT) with divalent metal halides (cobalt chloride, iron chloride, copper chloride and nickel chloride) in an aqueous alkaline solution at reflux temperatures. A black precipitate which conducted electricity was formed. Resistivity of the material increased upon exposure to air but decreased when oxygen was removed from the material.

16 Claims, 4 Drawing Sheets (I)

(II)

(III)

CONDUCTIVE POLYMERS OF TRANSITION-METAL COMPLEXES COORDINATED BY A DIAMINO-DICHALCOGEN-BENZENE COMPOUND

BACKGROUND OF THE INVENTION

1. Field of the Invention

This invention relates to conductive materials, more specifically, to undoped conductive organic ladder polymers.

2. Description of the Prior Art

Numerous resinous compositions that conduct electricity are known. Many are an organic resin with a conductive material, such as metal or graphite, dispersed in the resin. This type of conductive polymer is exemplified by Japanese patent No. 87/29007 which teaches kneading 20 parts of nickel coated wollastonite into 80 parts of polyoxymethylene. The mechanical properties for this type of conductive polymers are deficient in areas such as flexibility, moldability and durability.

Conductive polymers also can be obtained by precise pyrolytic treatment of a polymer such as a phthalonitrile resin. As disclosed in "Phthalonitrile-based Conductive Polymer"-Keller, J. of Pol. Sci., Vol. 25, p. 2569-2576 (1987), pyrolysis of a thermosetting resin resulted in a continuous network of polyconjugated fused rings which were conductive. Polymers made in this manner are stable but conductivity varies as a result of minor differences in pyrolytic temperature and annealing time.

Polymers which are complexed with a dopant such as radical anion salts of 7,7,8,8-tetracyanoquinodimethane (TCNQ) are other examples of conductive polymers. As shown in U.S. Pat. No. 3,966,987, TCNQ is added to a polymer in a mutual solvent to form a solution from which a film is cast. The resulting polymer is conductive but can be chemically and electrically unstable in ambient conditions.

In earlier studies of undoped polymeric conductors by this inventor, heteroaromatic ladder polymers were found to be stable and highly intrinsic semiconductors. These properties were mainly the result of a coplanar ladder structure. One example is phenothiazine ladder (PTL) polymer prepared by polycondensation of 2,5-diamino-1,4-benzenedithiol (DADT) and 2,5-dichloro-p-benzoquinone (U.S. Pat. No.4,618,453). A typical value for conductivity for undoped PTL polymer is $5.0 \times 10^{-6}$ S/cm. Doping the PTL polymer with a protonic acid material such as $ClSO_3H$ increases the conductivity to a typical value of $2.1 \times 10^{-2}$ S/cm. It would be advantageous to have increased conductivity without doping.

SUMMARY OF THE INVENTION

Accordingly, an object of this invention is to prepare a highly conductive undoped polymer.

Another object of this invention is to provide a highly conductive polymer that is stable in ambient conditions.

Yet another object of this invention is to prepare a highly conductive polymer that is stable against both thermal and chemical degradation.

A further object of this invention is to prepare a highly conductive polymer without precise high temperature pyrolysis.

These and other objects are accomplished by a polymer with a hybrid ladder structure made by coordination of transition metals with quadridentate ligands forming a square planar configuration.

BRIEF DESCRIPTION OF THE DRAWINGS

A more complete appreciation of the invention and many of the attendant advantages thereof will be readily obtained by reference to the following detailed description when considered in connection with the accompanying drawings.

DETAILED DESCRIPTION OF THE INVENTION

Figure 1:
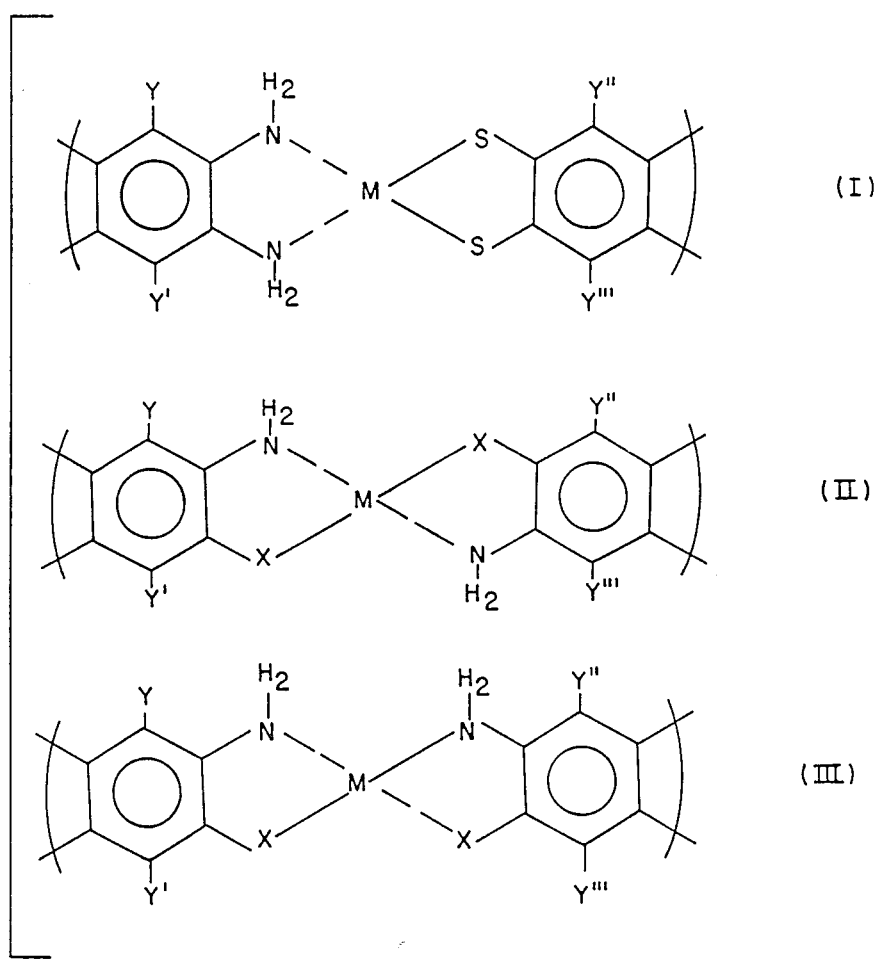
FIG. 1 is an illustration of the general structure of a polymeric metal complex.

The subject matter of this invention is a polymeric metal complex with high conductivity and stability of the formula and structures shown in FIG. 1 where X is a chalcogen, Y, Y', Y" and Y'" are a hydrogen or an alkyl group of thirty or less carbon atoms, n is the average number of repeating units of the polymer in the range from one to fifteen and M is a divalent metal.

In the preferred composition the chalcogen is sulfur or oxygen, the divalent metal is any from the group consisting of cobalt, iron (ferrous), copper, nickel, zinc, palladium, manganese, platinum and mixtures thereof, n is four to ten and Y, Y', Y" and Y'" are hydrogen or an alkyl chain of three or less carbon atoms if an insoluble product is desired and an alkyl chain of fourteen to twenty carbon atoms if a soluble product is desired. In the most preferred composition the chalcogen is sulfur, the divalent metal is cobalt, n is four to six and Y, Y', Y" and Y'" is hydrogen if an insoluble product is desired or an alkyl chain of sixteen carbon atoms if a soluble product is desired. It is recognized that the alkyl chain is almost unlimited in the number of carbon atoms it can contain, but as a practical matter the benefit of increased solubility is outweighed by the difficulty of making an alkyl chain of greater than thirty carbon atoms and the difficulty of bonding it to the aromatic ring.

The polymeric metal complex is synthesized by a coordination reaction of a diamino-dichalcogen-benzene compound and a transition metal(II) halide. Equimolar amounts of the diamino-dichalcogen-benzene compound and the metal halide are mixed in an aqueous alkaline solution and reacted in either air or an inert atmosphere. Reaction temperature is from 50° C. to 110° C. The reaction time varies with the temperature, i.e., reaction temperatures lower than reflux temperature (approximately 110° C.) would require longer reaction time.

The transition metal(II) halides are of the general formula $MZ_2$ where M is the transition metal which can be selected from the group consisting of cobalt, iron (ferrous), copper, nickel, zinc, palladium, manganese and platinum, and Z is a halogen. The preferred halogen is chlorine. An example of this compound is cobalt chloride.

The diamino-dichalcogen-benzene compound used to form the compound of this invention is one in which the amino groups and chalcogens are located in a symmetrical pattern around the aromatic ring. For example, when the amino groups are at para positions in regard to each other, the chalcogens are at para positions in regard to each other with the hydrogen or alkyl groups at para positions in regard to each other.

Alternatively, when the amino groups are at meta positions in regard to each other, the chalcogens are at meta positions in regard to each other with the hydrogen or alkyl groups at para positions in regard to each other. As another possibility, when the amino groups are at ortho positions in regard to each other, the chalcogens are at ortho positions in regard to each other with the hydrogen or alkyl groups at para positions in regard to each other The general formula of the diamino-dichalcogen-benzene compound is $C_6Y_2(NH_2)_2X_2$ and the structures are shown below

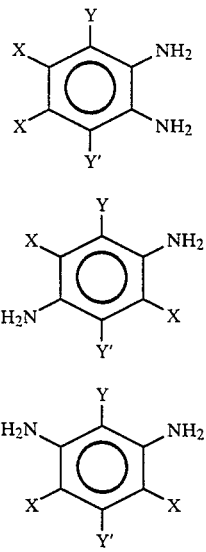

where X is a chalcogen and Y and Y' are hydrogen or an alkyl group of thirty or less carbon atoms. Two examples of these compounds are 2,5-diamino-1,4-benzenedithiol (DADT) and 2,5-diamino-p-hydroquinone. The preferred diamino-dichalcogen-benzene compound is (II) above.

When the product is formed from a diamino-dichalcogen-benzene compound with Y and Y' being hydrogen, a black precipitate results which is insoluble in organic solvents. When an alkyl group is substituted for the hydrogen, the precipitate formed is soluble in organic solvents. The longer the alkyl chain, the better will be the solubility. The two alkyl chains need not contain the same number of carbon atoms.

The resistivity of a polymeric metal complex increases upon exposure to air. This increases in resistivity is thought to be due to an affinity these polymeric metal complexes have for oxygen binding to the metal upon exposure to air. This is a reversible reaction. When oxygen is removed, the resistivity decreases but increases again when the polymeric metal complex is again exposed to air.

Now, having generally described the invention, the following examples specifically illustrate the invention;

EXAMPLE 1

A solution of 0.91 grams of cobalt chloride in 11 milliliters of $N_2$-purged deionized water were added to 0.5 grams of DADT in 50 milliliters of $N_2$-purged deionized water in a 150 milliliter flask equipped with a condenser. Initially, 3 milliliters of aqueous ammonium hydroxide were added to obtain a pH of 10.5 minimum. The flask was placed in an oil bath and the temperature was raised to the refluxing point of the solution (approximately 110° C.). Aqueous ammonium hydroxide was added to maintain the pH at 10.5 to 11.0. After refluxing for 24 hours, the flask was removed from the oil bath and a black precipitate was collected from the solution on a fritted glass by filtration. It was thoroughly washed with $N_2$-purged deionized water, then acetone and dried overnight under vacuum at 100° C. The elemental analysis is shown below.

|  | % | | | | | |
|---|---|---|---|---|---|---|
|  | C | H | N | S | Co | O |
| Calculated | 25.67 | 2.56 | 9.98 | 22.89 | 25.20 | 13.89 |
| Found | 25.78 | 2.43 | 9.72 | 22.73 | 25.02 | 13.73 |

As evidenced by the elemental analysis showing a molar ratio of DADT/metal=1 (excluding the terminal groups), the product's structure was assumed to be a polymeric square planar ribbon-shaped bis-DADT/-metal (II) complex as shown below.

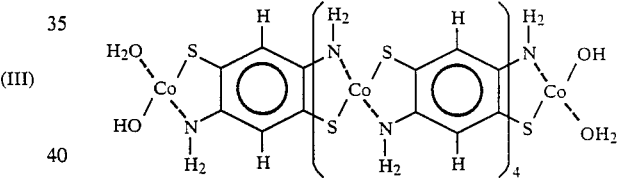

This structure resembled the coplanar ladder structure of other undoped conductive polymers, such as PTL. After grinding and pelletization of the precipitate in an oxygen-free atmosphere, room temperature conductivity of a sample was measured by four point probe technique in inert atmosphere. Conductivity was 1.03 S/cm.

EXAMPLE 2

The procedure above was repeated with refluxing being carried out in air. The black precipitate was treated in the same manner as above. The conductivity for this material was $6 \times 10^{-1}$ S/cm.

Figure 2:
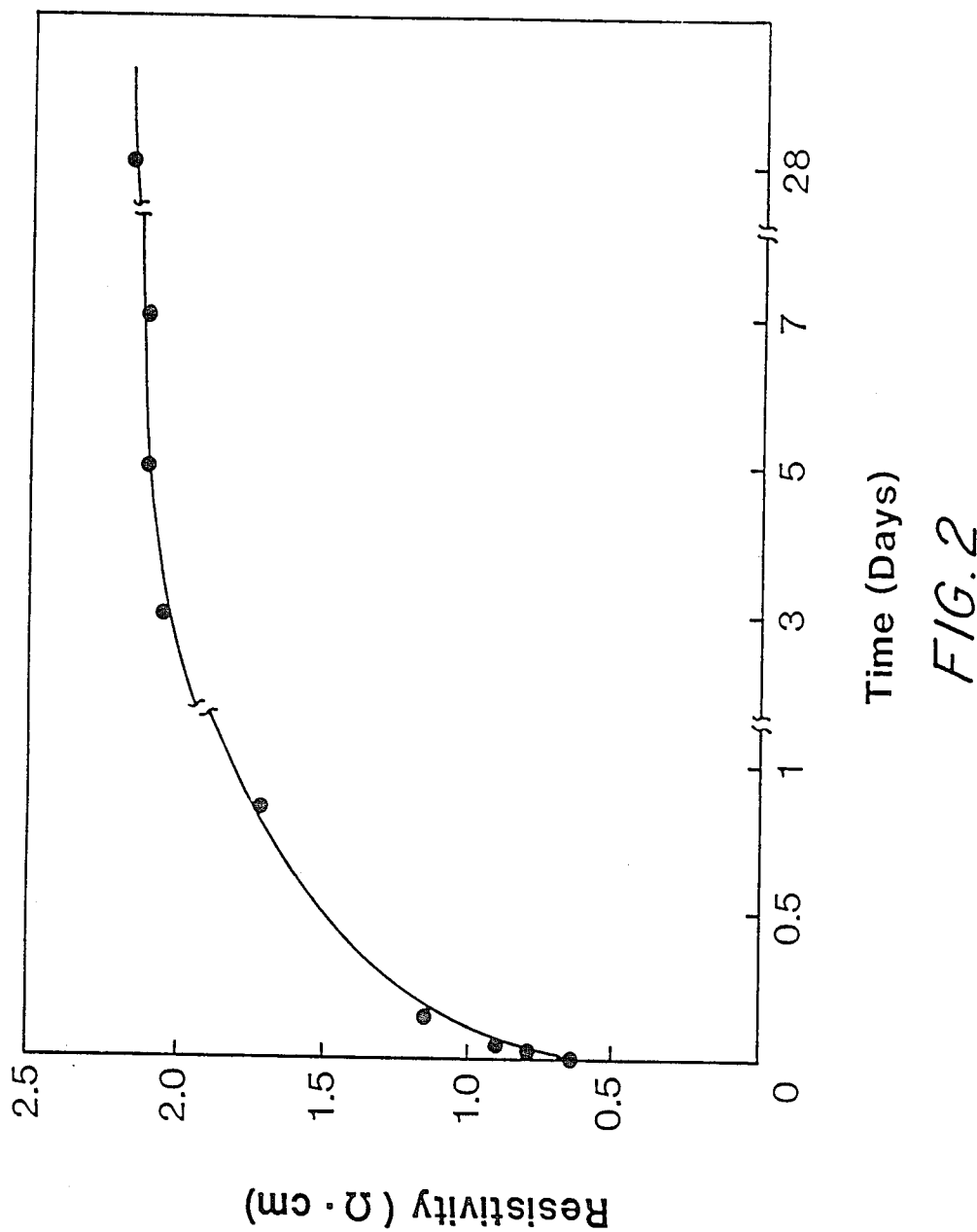
FIG. 2 is a graph of resistivity of the conductive polymer versus time in days.
Figure 3:
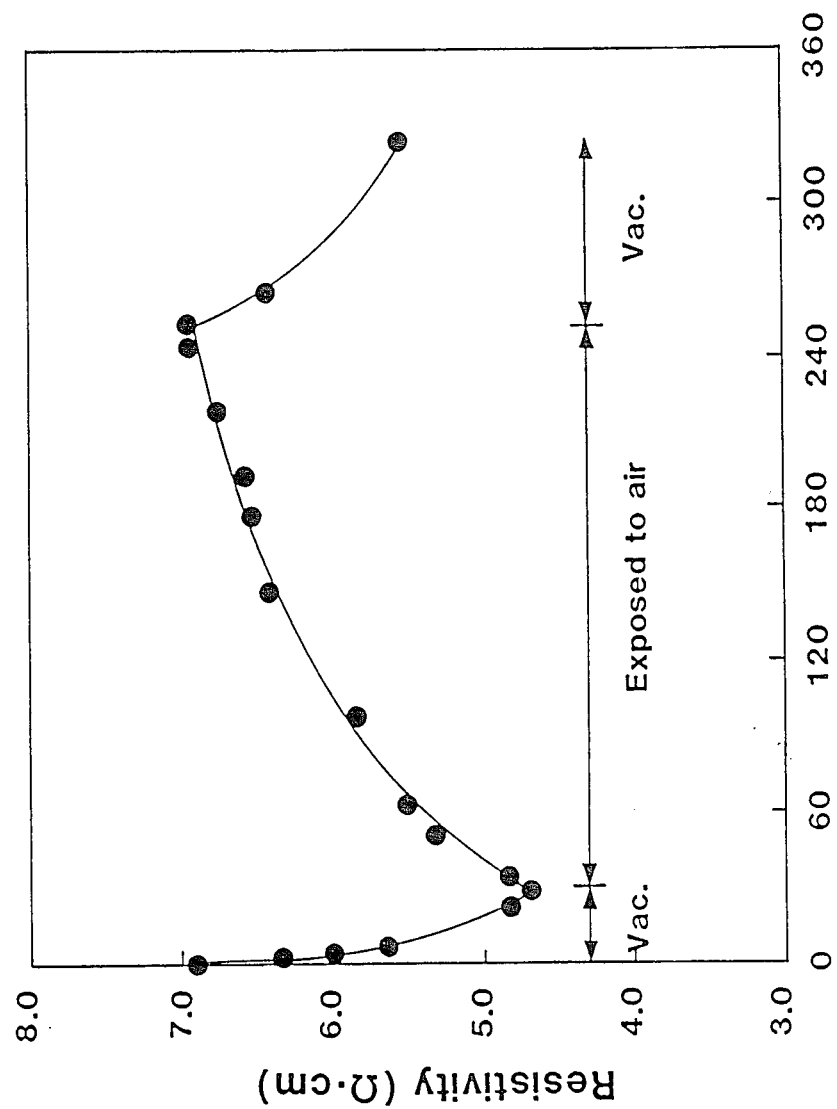
FIG. 3 is a graph of resistivity of the conductive polymer versus time in hours illustrating the effect of removing oxygen from the polymer by vacuum.
Figure 4:
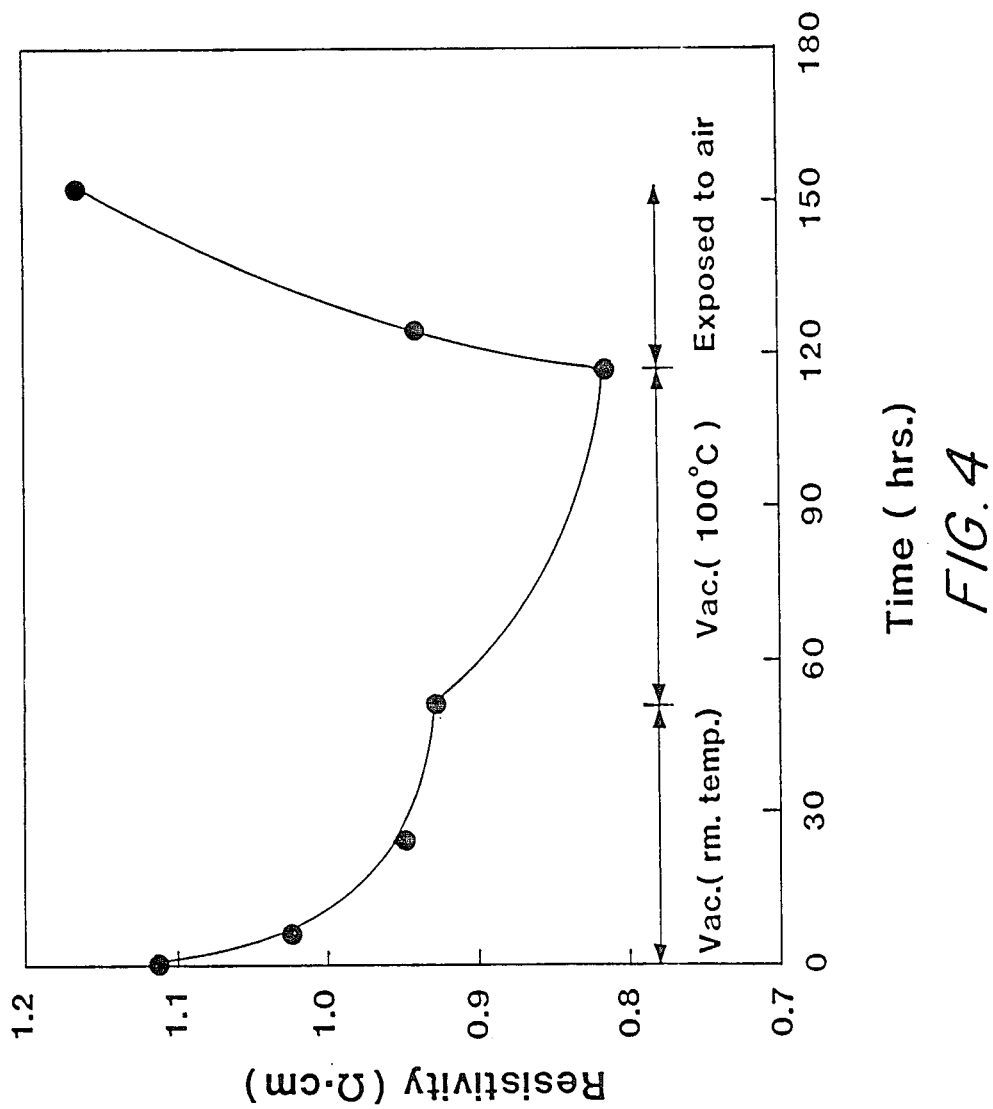
FIG. 4 is a graph of resistivity of the conductive polymer versus time in hours illustrating the effect of removing oxygen from the polymer by heat under vacuum.

The polymeric cobalt metal complex showed an increase in resistivity upon exposure to air. The change was rather fast in the beginning but soon leveled off as shown in FIG. 2. The initial increase was less than one order of magnitude and remained unchanged over months thereafter. It was observed that the resistivity decreased when oxygen was removed under vacuum at room temperature and increased when the polymer was exposed to air again as shown in FIG. 3. A further decrease in resistivity was obtained when oxygen was removed under vacuum at 100° C. but again resistivity increased when the polymer was re-exposed to air as shown in FIG. 4.

EXAMPLE 3

A solution of 0.365 grams of iron chloride ($FeCl_2$) in 7 milliliters of distilled water were added to a suspension of 0.25 grams of DADT in 25 milliliters of $N_2$-purged deionized water in a 100 milliliter flask equipped with a condenser. The reaction was carried out under the same conditions as Example 1 above, except that the refluxing was continued for 48 hours. Sample preparation was also the same as above, except the preparation (grinding, pelletization and storage) was carried out in an air atmosphere. The elemental analysis is shown below.

| | %  | | | | | |
|---|---|---|---|---|---|---|
| | C | H | N | S | Fe | O |
| Calculated | 26.38 | 2.32 | 10.26 | 23.46 | 23.88 | 13.68 |
| Found | 26.68 | 2.26 | 9.43 | 23.95 | 25.08 | 13.02 |

The product was assumed to be the same as shown in FIG. 4 except Fe was substituted for Co. Conductivity was measured as described above and found to be $1.6 \times 10^{-2}$ S/cm for material made in inert atmosphere and $2.0 \times 10^{-2}$ S/cm for material made in air.

EXAMPLES 4 AND 5

The procedure of Example 1 was repeated using DADT and copper chloride and DADT and nickel chloride. Conductivity for the polymeric copper metal complex was $1.2 \times 10^{-3}$ S/cm for material made in inert atmosphere and $8 \times 10^{-5}$ S/cm for material made in air. Conductivity for the polymeric nickel metal complex was $4.8 \times 10^{-6}$ S/cm for material made in inert atmosphere and $5 \times 10^{-6}$ S/cm for material made in air. The samples for conductivity measurements were prepared (grinding, pelletization and storage) both in air and inert atmosphere. Differences in conductivity values were negligible.

EXAMPLE 6

The procedure of Example 1 was repeated using sodium hydroxide in the place of ammonium hydroxide during the reflux operation. An aqueous solution of 0.62 grams of cobalt chloride in 9 milliliters of $N_2$-purged deionized water Was added to 0.345 grams of DADT in 35 milliliter of $N_2$-purged deionized water in a 100 milliliter flask equipped with a condenser. Initially, 9 milliliters of 1 Normal sodium hydroxide was added to give pH of approximately 11. The mixture was heated to the reflux point in an oil bath. The reaction continued for 24 hours under an inert atmosphere while sodium hydroxide was added to maintain pH at 10.5 to 11.0. Sample preparation was the same as Example 1 above for cobalt chloride and DADT in a aqueous ammonium hydroxide solution. The initial conductivity of this material was 1.6 S/cm which is higher than the material made with ammonium hydroxide.

These conductive polymers are an improvement over the heteroaromatic ladder polymers. The conductivity values for material with copper or nickel as the transition metal had conductivity values equal to or greater than a typical undoped PTL polymer. Conductive polymers with cobalt or iron as the transition metal had conductivity values equal to or greater than those for a typical doped PTL polymer.

Conductive polymers would be useful to replace metallic conductors in any application where weight is a consideration, such as lightweight batteries or in aircraft. They also have the advantage over metallic conductors in that they are not as susceptible to corrosion.

The affinity to oxygen makes these polymers useful as a detector for oxygen where the presence of oxygen would be indicated by the decrease in conductivity. These polymers could also find application as an oxygenation catalyst. Furthermore, the polymer's ability to be an oxygen carrier in its soluble form could have application as a hemoglobin substitute.

Obviously, additional modifications and variations of the present invention are possible in light of the above teaching. It is therefore to be understood that within the scope of the appended claims the invention may be practiced otherwise than as specifically described herein.

What is claimed as new and desired to be secured by letter of patent of the United States is:

1. A polymer with the repeating unit of the formula:

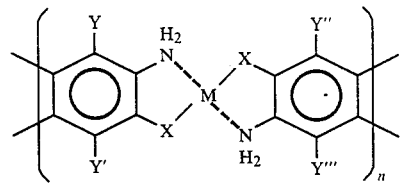

where X is a chalcogen, M is a divalent metal, Y, Y', Y" and Y"' are hydrogen or an alkyl group of thirty or less carbon atoms and n is the average number of repeating units of the polymer in the range from one to fifteen.

2. A polymer with the repeating unit of the formulae:

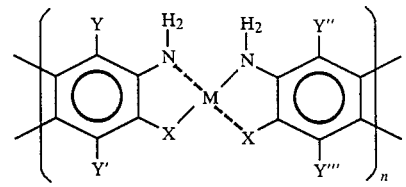

where X is a chalcogen, M is a divalent metal, Y, Y', Y" and Y"' is hydrogen or an alkyl group of thirty or less carbon atoms and n is the average number of repeating units of the polymer in the range from one to fifteen.

3. A polymer with the repeating unit of the formula:

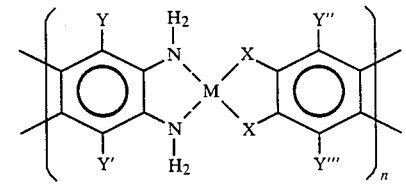

where X is a chalcogen, M is a divalent metal, Y, Y', Y" and Y"' are hydrogen or an alkyl group of thirty or less carbon atoms and n is the average number of repeating units of the polymer in the range from one to fifteen.

4. A polymer as recited in claim 1, wherein M is a divalent metal selected from the group consisting of cobalt, iron (ferrous), copper, nickel, zinc, palladium, manganese, platinum and mixtures thereof.

5. A polymer as recited in claim 2, wherein M is a divalent metal selected from the group consisting of cobalt, iron (ferrous), copper, nickel, zinc, palladium, manganese, platinum and mixtures thereof.

6. A polymer as recited in claim 3, wherein M is a divalent metal selected from the group consisting of cobalt, iron (ferrous), copper, nickel, zinc, palladium, manganese, platinum and mixtures thereof.

7. A polymer as recited in claim 4 wherein the chalcogen is sulfur.

8. A polymer as recited in claim 5 wherein the chalcogen is sulfur.

9. A polymer as recited in claim 6 wherein the chalcogen is sulfur.

10. Polymer as recited in claim 4 wherein the chalcogen is oxygen.

11. A polymer as recited in claim 5 wherein the chalcogen is oxygen.

12. A polymer as recited in claim 6 wherein the chalcogen is oxygen.

13. A polymer as recited in claim 1 wherein X is sulfur, M is cobalt, Y, Y', Y" and Y'" are hydrogen, n is four and the end groups are of the formula

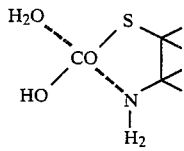

14. A polymer as recited in claim 1 wherein X is sulfur, M is iron, Y, Y', Y" and Y'" are hydrogen, n is five and the end groups are of the formula

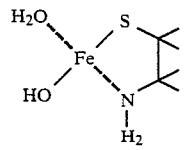

15. A polymer as recited in claim 1 wherein X is sulfur, M is copper, Y, Y', Y" and Y'" are hydrogen, n is four and the end groups are of the formula

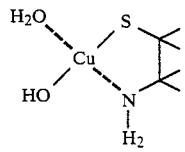

16. A polymer as recited in claim 1 wherein X is sulfur, M is nickel, Y, Y', Y" and Y'" are hydrogen, n is five and the end groups are of the formula

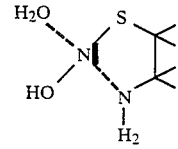

* * * * *